(No Model.)
W. A. GRAHAM.
HYDRANT.
No. 570,283. Patented Oct. 27, 1896.
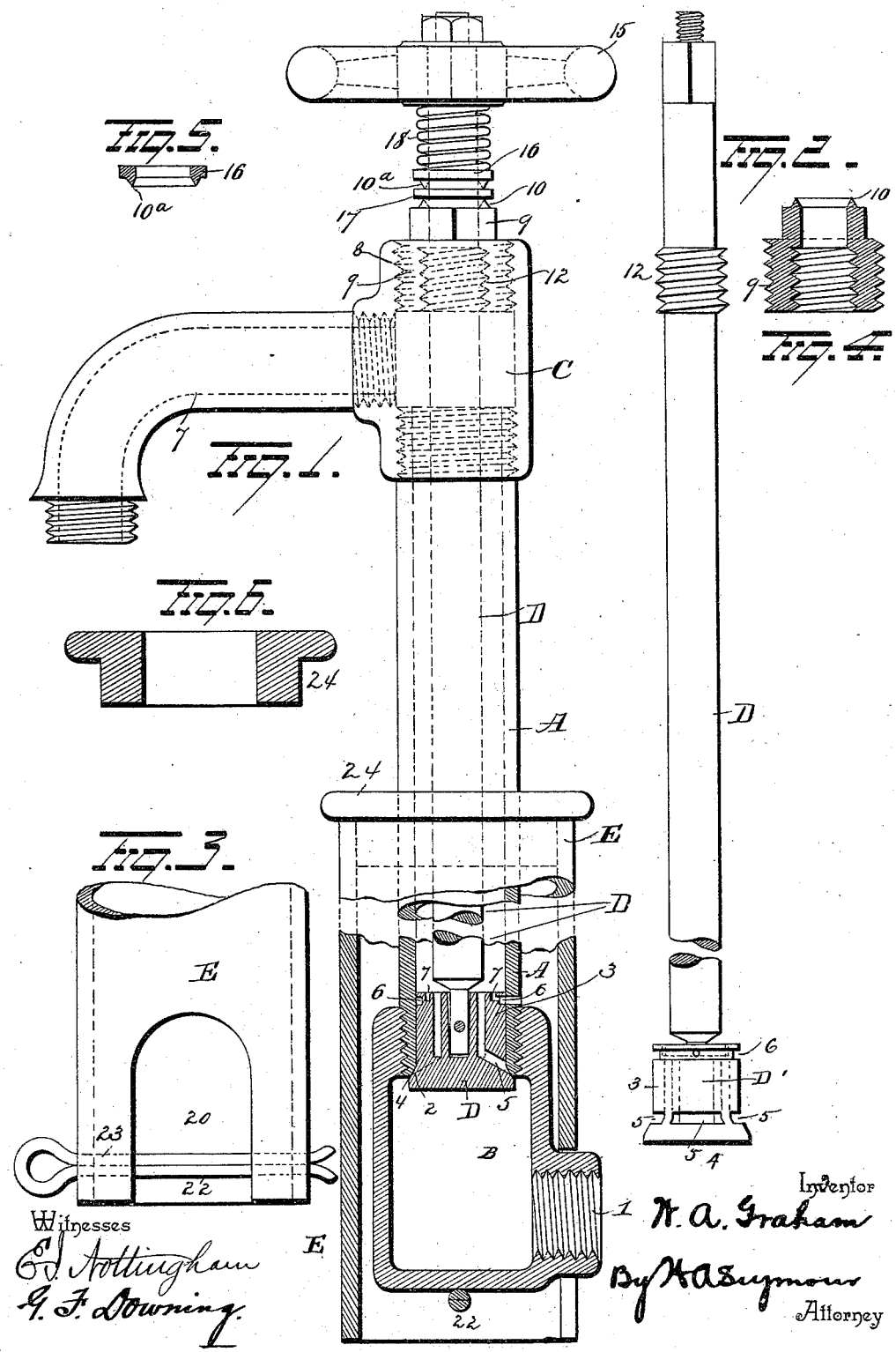
Witnesses
E. J. Nottingham
G. F. Downing
Inventor
W. A. Graham
By H. A. Seymour
Attorney

UNITED STATES PATENT OFFICE.

WILLIAM A. GRAHAM, OF CARLISLE, PENNSYLVANIA.

HYDRANT.

SPECIFICATION forming part of Letters Patent No. 570,283, dated October 27, 1896.

Application filed October 18, 1895. Serial No. 566,105. (No model.)

*To all whom it may concern:*

Be it known that I, WILLIAM A. GRAHAM, of Carlisle, in the county of Cumberland and State of Pennsylvania, have invented certain new and useful Improvements in Hydrants; and I do hereby declare the following to be a full, clear, and exact description of the invention, such as will enable others skilled in the art to which it appertains to make and use the same.

My invention relates to an improvement in hydrants, the object being to provide a simple and inexpensive device which can be easily taken apart and repaired and put together again without the necessity of any digging and tearing up of the ground or sidewalk after the hydrant has once been connected with the main.

With these objects in view my invention consists in certain novel features of construction and combinations of parts, which will be hereinafter described, and pointed out in the claim.

In the accompanying drawings, Figure 1 is a view in elevation of my hydrant complete, dotted lines being used to indicate the internal construction. Fig. 2 is the valve-controlling rod detached. Fig. 3 is a detail of the lower end of the outer casing. Fig. 4 is a view of the screw and valve-seat at the upper end of the hydrant. Fig. 5 is a detached view of valve mechanism at the top of the hydrant, and Fig. 6 is a view of the collar at the top of the outer casing.

A represents the main pipe of the hydrant, and B is a coupling screwed or otherwise secured at 1 to the water-main and to the upper end of which the lower end of the pipe A is screwed. The lower end of this pipe is ground off to form a valve-seat 2. A coupling C is screwed to the upper end of pipe A and from it spout of nozzle 7 leads. In the upper threaded end 8 of this coupling C an externally and internally screw-threaded plug 9 is screwed. This plug is provided with an annular V-shaped flange or seat 10, which will be referred to hereinafter.

A valve-controlling rod D extends through the pipe A. The valve D' is pivotally connected with the lower end of this rod. The valve employed is preferably cast of bronze and consists of an upper cylindrical portion 3, fitted to the inner wall of the pipe, and the conical lower portion 4, which engages the valve-seat. Ports 5 5 extend from the outside of the valve into its interior to allow water to pass through it when the valve is lowered from its seat. The valve is also provided with an annular groove 6 on its exterior adapted to register with drip-openings in pipe A when the water is shut off to allow water in the hydrant to run out and prevent freezing. Openings 7 7 from the top of the valve lead to this annular groove to let this water escape. This valve-controlling rod is provided with a threaded portion 12, the threads of which register with the internal threads of the plug 9, whereby when the rod is turned it is raised or lowered to control the valve. The upper end of the rod is provided with a wheel or handle 15, by which it is turned back and forth. A ring 16, loosely mounted on the rod D, is provided with an annular V-shaped flange $10^a$, corresponding to the one 10 on plug 9, and between these annular V-shaped flanges 10 and $10^a$ a washer 17 is interposed. This is of some soft material. A spiral spring 18 surrounds the rod D above the ring 16 and holds the latter tight against the washer 17, thus forming an effectual valve at this point to prevent the escape of water, due to back pressure, which might possibly find its way between the screw-threads when a hose is attached to the nozzle.

Surrounding the pipe A is an outer casing E. This has a slot 20 therein to clear the lateral joint 1 of the lower coupling B, and a key 22 is passed through holes 23 23 in this casing below the coupling to hold the casing down in place. The upper end of this casing is closed by means of a ring 24. (Shown in Fig. 6.)

It will be readily seen how easily this hydrant is taken apart and repaired. In the event that a new valve is to be placed in the valve-chamber 1 it is simply necessary to unscrew the pipe A and temporarily remove it long enough to remove the valve from the chamber 1. The rod and pipe are then replaced. Thus it will be seen that the necessity for all digging is done away with and the whole operation is quickly performed. The hydrant is not only quickly and cheaply repaired, but also the initial cost is very small, because the greater portion of the apparatus is made of ordinary piping and the joints and mountings are of the simplest character.

It is evident that numerous slight changes might be resorted to in the general arrangement and combinations of parts without departing from the spirit and scope of my invention, and hence I would have it understood that I do not limit myself to the precise construction herein set forth; but, Having fully described my invention, what I claim as new, and desire to secure by Letters Patent, is—

In a hydrant, the combination with a pipe and a coupling, of a casing surrounding the said parts and a key extending through the latter beneath the coupling to lock the casing in position, substantially as set forth.

In testimony whereof I have signed this specification in the presence of two subscribing witnesses.

WILLIAM A. GRAHAM.

Witnesses:
GEORGE F. DOWNING,
VERNON E. HODGES.